United States Patent
Luskin et al.

(10) Patent No.: US 7,463,281 B2
(45) Date of Patent: Dec. 9, 2008

(54) SMART VEHICLE VIDEO MANAGEMENT (75) Inventors: Eugene Luskin, Issaquah, WA (US);
Andrew Petrochuk, Bellevue, WA (US);
David Kizhnerman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 876 days.

(21) Appl. No.: 10/735,393

(22) Filed: Dec. 12, 2003

(65) Prior Publication Data

US 2005/0030379 A1    Feb. 10, 2005

Related U.S. Application Data (60) Provisional application No. 60/493,384, filed on Aug. 6, 2003.

(51) Int. Cl.
*H04N 7/18* (2006.01)
*H04N 9/47* (2006.01)

(52) U.S. Cl. .................................................. 348/148
(58) Field of Classification Search ........................ None
See application file for complete search history.

(56) References Cited

U.S. PATENT DOCUMENTS

| | | | |
|---|---|---|---|
| 5,432,904 A | 7/1995 | Wong | |
| 5,491,631 A | 2/1996 | Shirane et al. | |
| 5,539,869 A | 7/1996 | Spoto et al. | |
| 5,557,268 A | 9/1996 | Hughes et al. | |
| 5,579,227 A | 11/1996 | Simmons, Jr. et al. | |
| 5,598,208 A * | 1/1997 | McClintock | 348/159 |
| 5,680,123 A * | 10/1997 | Lee | 340/937 |
| 5,794,164 A | 8/1998 | Beckert et al. | |
| 6,182,010 B1 | 1/2001 | Berstis | |
| D439,257 S | 3/2001 | Rossow et al. | |
| 6,202,008 B1 | 3/2001 | Beckert et al. | |
| 6,212,449 B1 | 4/2001 | Wellman et al. | |
| 6,222,447 B1 * | 4/2001 | Schofield et al. | 340/461 |
| 6,278,919 B1 | 8/2001 | Hwang et al. | |
| 6,339,736 B1 | 1/2002 | Moskowitz et al. | |
| 6,370,449 B1 | 4/2002 | Razavi et al. | |
| 6,370,454 B1 | 4/2002 | Moore | |
| 6,438,471 B1 | 8/2002 | Katagishi et al. | |
| 6,505,525 B2 * | 1/2003 | McGrew | 73/865.8 |
| 6,611,740 B2 | 8/2003 | Lowrey et al. | |
| 6,675,006 B1 * | 1/2004 | Diaz et al. | 455/404.1 |
| 6,701,231 B1 | 3/2004 | Borugian | |
| 6,735,503 B2 | 5/2004 | Ames | |
| 6,902,284 B2 * | 6/2005 | Hutzel et al. | 359/865 |
| 7,003,289 B1 | 2/2006 | Kolls | |
| 7,308,341 B2 | 12/2007 | Schofield et al. | |
| 2002/0003571 A1 * | 1/2002 | Schofield et al. | 348/148 |

\* cited by examiner

*Primary Examiner*—Nhon T Diep
(74) *Attorney, Agent, or Firm*—Lee & Hayes, PLLC (57) ABSTRACT

A method includes selecting a video source view from at least one of a plurality of vehicle-mounted video sources based on detection of a vehicle event. The video source view may be displayed according to a presentation mode. The method may include associating a plurality of vehicle events with a video source view or video presentation mode. A system includes display logic selecting a video source view from a plurality of vehicle-mounted video sources based on detection of a vehicle event. The system can include presentation rules specifying an association between a plurality of vehicle events and a video source view and/or a video presentation mode. The presentation rules are editable and configurable.

46 Claims, 8 Drawing Sheets

SMART VEHICLE VIDEO MANAGEMENT

CROSS-REFERENCE TO RELATED APPLICATIONS

The present application is a non-provisional utility application based on and claiming priority from U.S. Provisional Patent Application No. 60/493,384 entitled "SMART VIDEO MANAGEMENT" filed on Aug. 6, 2003 and assigned to the Assignee of the present application. The present application is related to concurrently filed U.S. patent application Ser. No. 10/735,382entitled "ENHANCED VEHICLE EVENT INFORMATION", and U.S. patent application Ser. No. 10/734,515 entitled "REMOTE VEHICLE SYSTEM MANAGEMENT", both of which are assigned to the Assignee of the present application.

TECHNICAL FIELD

The described subject matter relates to video management. More particularly, the subject matter relates to smart video management for a vehicle.

BACKGROUND

Video systems are becoming prevalent in automobiles and other vehicles. Once limited to large vehicles, like busses and recreational vehicles, video systems are now available as options on consumer vehicles, either from the dealer or from an aftermarket supplier. Automobile video systems typically include one or more video cameras mounted outside the automobile and connected to a display device in the automobile to provide view(s) of the automobile surroundings. Video cameras mounted on the automobile can provide views of blind spots that the driver can't see with just the rear view mirrors. In addition, an in-vehicle display can provide a view closer to the driver than the rear view mirrors, which requires less head movement on the part of the driver.

Unfortunately, a typical automobile video system requires the driver to actively manage the video system, which can distract the driver's attention from driving the automobile. For example, if more than one video camera is installed, the driver must choose which video camera view to be displayed on the display device. Choosing the view typically requires the driver to remove a hand from the steering wheel and manually select which camera view is displayed using a touchpad or other input device. While selecting a view, the driver must watch the display screen to determine whether the desired view is being displayed. Meanwhile, the driver must navigate the automobile. Depending on how many cameras are installed, the selection process may pose a substantial distraction from the task of navigating the automobile.

SUMMARY

Implementations of systems and methods described and claimed herein solve the discussed problems, and other problems, by providing smart vehicle video management. A video management scheme displays one or more video source images based on presentation rules related to automobile events. The presentation rules associate vehicle events with video presentation modes. The video presentation rules and modes may be extensible and user-configurable.

An implementation of a method selects a video source view from at least one of a plurality of vehicle-mounted video sources based on detection of a vehicle event. The video source view may be displayed according to a presentation mode. The method may include associating a plurality of vehicle events with a video source view or video presentation mode.

An implementation of a system includes display logic selecting a video source view from a plurality of vehicle-mounted video sources based on detection of a vehicle event. The system can include presentation rules specifying an association between a plurality of vehicle events and a video source view and/or a video presentation mode.

An implementation of a vehicle includes a computer having display logic selecting a video source view from at least one of a plurality of video sources mounted on the vehicle based on detection of a vehicle event. The vehicle may further include a display device to display the video source view according to a presentation mode. The vehicle may further include a vehicle sensor detecting the vehicle event. The computer may further include a computer-readable medium having stored thereon a presentation rule including an association between a plurality of vehicle events and at least one video source view.

An implementation of a computer program product provides a computer program storage medium readable by a computer system and encoding a computer program that applies vehicle video presentation rules in response to one or more detected vehicle event(s). Presentation rules may associate video presentation views and/or modes with vehicle event indicators to determine an appropriate video source view and/or video presentation mode based on detected vehicle events.

DETAILED DESCRIPTION

Overview

Exemplary implementations of methods, systems, devices, computer program products, and data structures are disclosed for presenting one or more vehicle video source views based on vehicle events. Traditional systems require the driver to manually select from multiple video source views, which may seriously distract the driver from the task of operating the vehicle, which, in turn, may endanger property, as well as the driver and others around the vehicle. Implementations described herein provide for rule-based presentation of video view(s) without requiring the driver to manually select the desired view(s).

Exemplary Video Management Operating Environment

Figure 1:
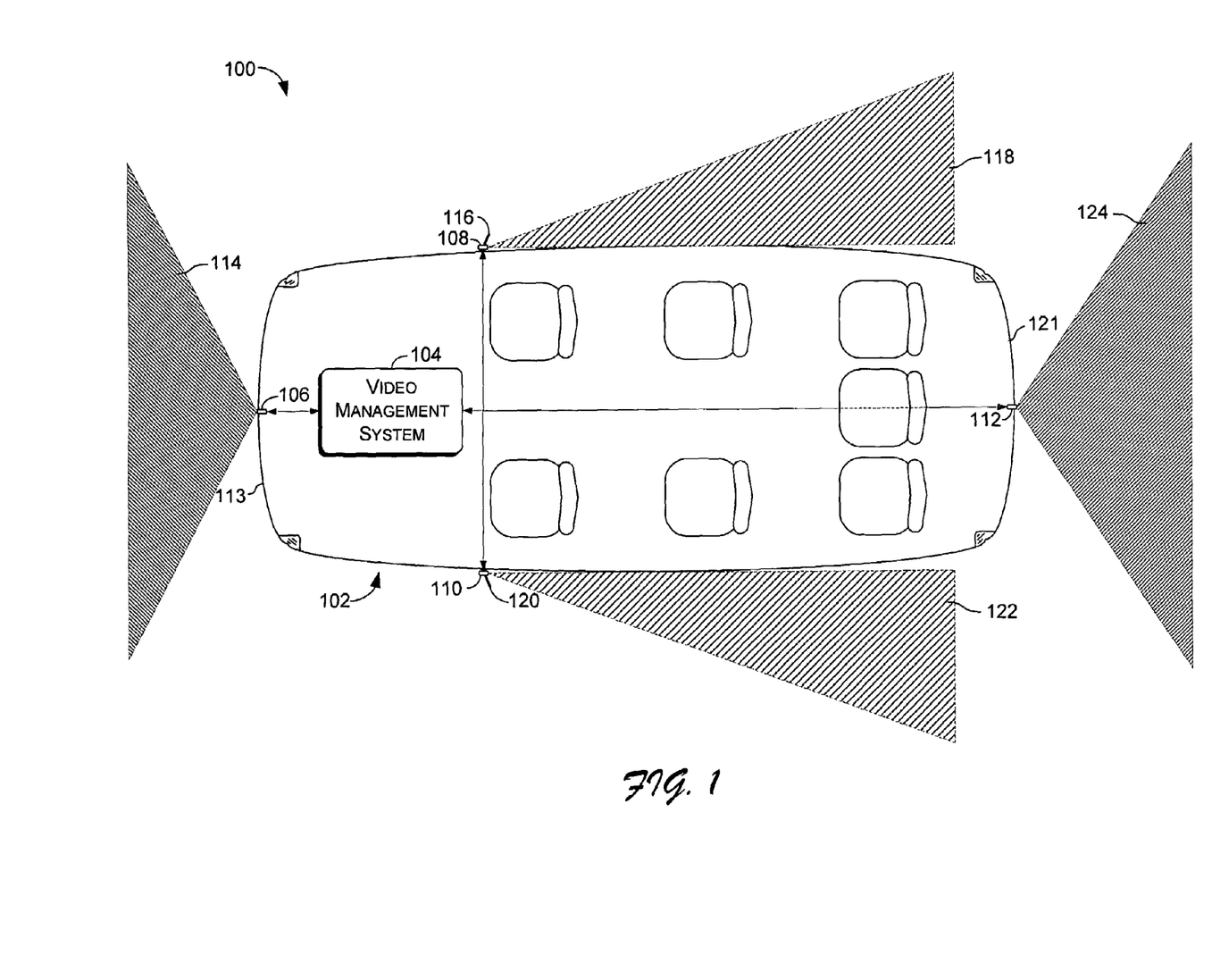
FIG. 1 illustrates an exemplary operating environment in which a smart vehicle video management scheme may be employed.

FIG. 1 illustrates an exemplary operating environment 100 in which a smart vehicle video management scheme may be employed. The environment 100 includes a vehicle 102, shown in a plan view in FIG. 1. Multiple video sources, or video capturing devices, are mounted to the vehicle 102 such that each of the video sources captures a video source view around the vehicle 102. A video source view is a view captured by a video capturing device, and is typically represented in an analog or digital signal. The captured video views from the video sources are communicated to a video management system 104, which determines how the captured video view is to be presented on an in-vehicle display device.

As shown in FIG. 1, the multiple video sources may include a front video camera 106, a passenger side video camera 108, a driver's side video camera 110, and a rear video camera 112. In the exemplary arrangement shown in FIG. 1, the front video camera 106 is mounted on a front section 113 of the vehicle 102 to capture a front field of view 114. In other implementations, the front video camera 106 can be mounted somewhere other than the front section 113, and aimed in a forward direction to capture the front field of view 114. The implementation may include additional cameras such as driver eyes detection camera aimed to driver's eyes intended to detect if driver falls asleep. Cameras can also be mounted inside the vehicle to provide views of the vehicle interior. For example, cameras may be mounted inside directed at the rear seats to see children in car seats during the ride.

The passenger side video camera 108 is mounted to the passenger side mirror 116 or some other position and aimed to capture a passenger side field of view 118. The driver's side video camera 110 is mounted to the driver's side mirror 120 or some other position and aimed to capture a driver's side field of view 122. The rear video camera 112 is mounted on a rear section 121 of the vehicle 102 or some other position and aimed to capture a rear field of view 124.

The particular types of video cameras that may be used are not limited to any particular technology, format, brand, or otherwise. For example, the video cameras 106, 108, 110, and 112 may generate analog or digital video data. Preferably, the video cameras 106, 108, 110, and 112 are wide-angle cameras, but cameras without wide-angle capabilities may also be employed. A specific implementation employs compact, analog cameras (Items #PC 195XS and #PC6EX2) from SUPERCIRCUITS INC.

Smaller cameras may be preferred for easy mounting and to achieve a more appealing look, but the cameras 106, 108, 110, and 112 are not limited to any particular size. One or more of the cameras 106, 108, 110, and 112 may be night-vision cameras. The cameras may also include infrared (IR) sensitive video cameras with additional IR illuminators/sources and/or thermal video cameras to provide real night-vision images.

The vehicle video management system 104 analyzes vehicle events to determine the manner of presenting video data from the cameras 106, 108, 110, and 112. A vehicle event includes any occurrence or condition related to operation of the vehicle 102. Types of events that may be analyzed in a video management scheme are events related to the navigation of the vehicle 102, onboard diagnostics (OBD) events, or controls that a driver may use to operate the vehicle 102, such as blinker (or turn signal) controls or gear engagement, or application of the brakes, or fog lights switch. Vehicle events may also include signals from light sensors, temperature sensors, obstacle sensors, GPS, and other vehicle systems and devices.

The vehicle video management system 104 may be arranged in a casing or housing that is installed in one of various locations in the vehicle 102. One exemplary housing has a standardized size expressed in terms of Deutsche Industry Normen (DINs). The housing may be installed in the dashboard of the vehicle 102, under a floor board of the vehicle 102, in the trunk of the vehicle 102, or other convenient location, where signals from the video cameras 106, 108, 110, and 112, and vehicle events may be easily obtained.

A video management scheme as described herein using the video management system 104 may be beneficially implemented in any mobile vehicle to assist in operation, navigation, and control of the vehicle. Thus, the vehicle 102 is not limited to any particular type of vehicle. For example, the vehicle 102 may be an automobile. As another example, the vehicle 102 may be a farm tractor. As yet another example, the vehicle 102 may be a grader, a back-hoe, a paver, or other heavy equipment. Other examples of vehicles include boats, airplanes, helicopters, or bicycles. In addition, the video management scheme may be employed with a vehicle having a trailer (e.g., a boat, camper, etc.) attached. When a trailer is attached, the rear video sources may be mounted to the rear of the trailer.

Figure 2:
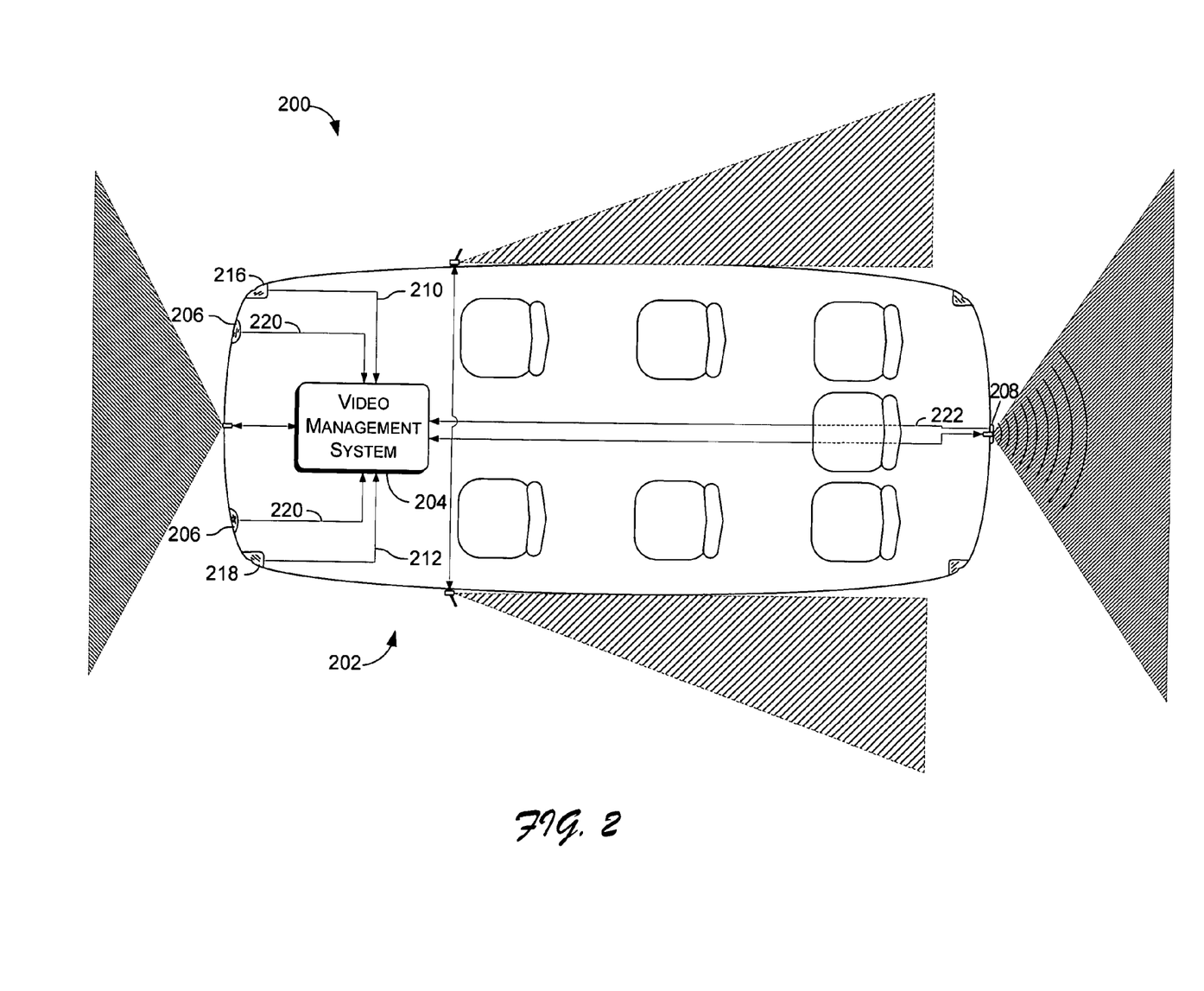
FIG. 2 illustrates another exemplary operating environment in which a smart vehicle video management scheme may be employed.

FIG. 2 illustrates another exemplary operating environment 200 in which a smart vehicle video management scheme may be employed. Another vehicle 202 is illustrated in a plan view. The vehicle 202 is similar to the vehicle 102 described above with respect to FIG. 1. For example, the vehicle 202 includes a video management system 204 that determines how vehicle video images are to be displayed based on vehicle events. Two differences between the vehicle 202 and the vehicle 102 (FIG. 1) include the addition of fog lights 206 and an obstacle sensor 208 in the vehicle 202.

Fog light signals 220 indicating whether the fog lights 206 are on, are input into the video management system 204. The fog light signals 220 may be obtained from the dashboard light switch or anywhere along the fog light circuit. A right turn signal (RTS) 210 and a left turn signal (LTS) 212 are shown as inputs into the video management system 214. The RTS 210 and the LTS 212 may be obtained from the dashboard turn signal switch or from anywhere along the circuit from the switch to associated right blinker 216 and left blinker 218. The RTS 210, LTS 212, and fog light signals 206 are exemplary indicators of vehicle events that may be used by the vehicle video management system 204 to determine the manner of displaying video images from vehicle video sources. Information about different signals can also be obtained directly from the standard embedded car computer using OBD/OBD-II/CAN or any other standard interface.

Another exemplary vehicle event indicator comes from the obstacle sensor 208. The obstacle sensor 208 generates an obstacle detection indicator 222. Obstacle sensors 208 typically detect obstacles by emitting an ultrasonic signal that is reflected by any obstacles that are present within a specified distance from the vehicle 202. If an obstacle is detected, the obstacle sensor 208 asserts the obstacle detection indicator 222, which is received by the vehicle video management system 204. Obstacle sensors may be placed in positions on the vehicle 202, in addition to the back of the vehicle 202, to detect obstacles on any side of the vehicle 202. As with the RTS 210, LTS 212, and fog light signal 220, the vehicle video management system 204 can use the obstacle detection indicator 222 to determine an appropriate video camera view to present on an in-vehicle display device.

The video management system 204 maps vehicle events to an appropriate view or views around the vehicle 202. To illustrate, if the obstacle detection indicator 222 indicates an obstacle has been detected to the rear of the vehicle 202, the rear view from the back video camera can be shown to the driver. As another example, if the driver's side back door is not completely shut, the driver's side view from the driver's side camera can be shown. As yet another example, when the RTS signal 210 is asserted indicating a right turn event, the passenger side video camera view can be shown. Other associations between vehicle events and video camera views can be created and configured as discussed in further detail below.

Figure 3:
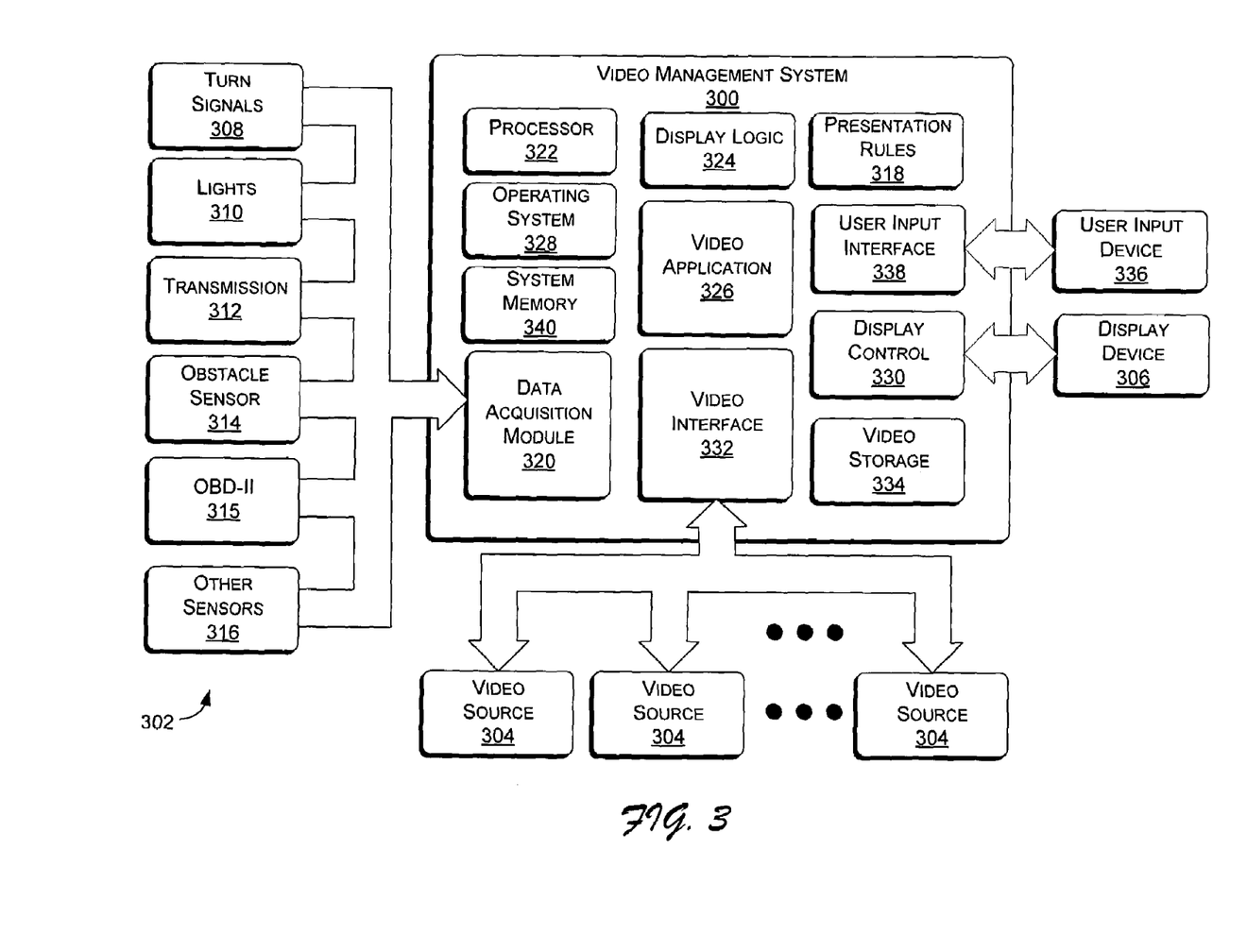
FIG. 3 is a block diagram of an exemplary vehicle video management system having functional modules for detecting vehicle events and presenting one or more video source views based on the events.

FIG. 3 illustrates an exemplary implementation of a video management system 300 that can employ a smart video management scheme in a vehicle. The video management system 300 interacts with one or more vehicle systems 302 to select images from one or more video sources 304 to display on a display device 306. In general, the video management system 300 receives event indicators from the vehicle systems 302. The event indicators indicate occurrences of vehicle events related to operation of the vehicle.

The vehicle systems 302 that may be used to detect and indicate vehicle events include a turn signal system 308, a lights system 310, a transmission system 312, an obstacle sensor 314, an onboard diagnostics II (OBD-II) system 315, or other sensors 316. The turn signal system 308 generates right and left turn signals indicating whether right and left turn signals are engaged, respectively. The lights system 310 generates signals indicating whether lights (e.g., fog lights, head lights, reverse lights) are on. The transmission system 312 generates signals indicating which gear is engaged (e.g., first, neutral, reverse).

The obstacle sensor 314 generates a signal that indicates whether an obstacle is near the vehicle. The other sensors 316 include any other detection systems, such as door switches, brakes, and other systems that can indicate events relevant to control, navigation, or operation of the vehicle.

The detected vehicle events are used to determine one or more modes of presenting video views from the video sources 304. As such, a particular implementation of the video management system 300 uses vehicle events that are related to the locations or directions of detection of the video sources 304. For example, assertion of the right turn signal preferably corresponds to presenting a video image from a vehicle video source 304 mounted on the right side of the vehicle. Presentation rules 318 specify how various combinations of events correspond to modes of video presentation.

A data acquisition module 320 receives raw event signals from the vehicle systems 302 and converts the raw signals into a format that is readable by a processor 322. The data acquisition module 320 includes hardware, software, firmware, or any combination thereof to facilitate conversion of the raw signals to processor-readable signals. A particular implementation of the data acquisition module 320, which is discussed in more detail with respect to FIG. 4, converts the raw vehicle signals into an RS-232 standard signal format.

In one implementation of the video management system 300, the display logic 324 uses the presentation rules 318 to map event indicators to video presentation modes. In this implementation, the display logic 324 is composed of software, hardware, firmware or any combination thereof, and the presentation rules 318 are implemented in one or more data structures that are stored in memory. An exemplary data structure containing presentation rules is shown in Table 1.

TABLE 1

Exemplary presentation rules table

| Event indicator (LT, RT, R, F) | Video modes (LV, RTV, RV, FV) |
|---|---|
| 0000 | DDDD |
| 0001 | DDDF |
| 0010 | DDFD |
| 0011 | DDFW |
| 0100 | DFDD |
| 0101 | DFDW |
| 0110 | DWFD |
| 0111 | DWFW |
| 1000 | FDDD |
| 1001 | FDDW |
| 1010 | WDFD |
| 1011 | WDFW |
| 1100 | DDDD |
| 1101 | DDDD |
| 1110 | DDDD |
| 1111 | DDDD |

Table 1 illustrates how event indicators, such as the left turn signal, right turn signal, reverse signal, and fog lights signal can be associated with video presentation modes. In the left column, event signal states are shown, wherein 'LT' represents left turn signal, 'RT' represents right turn signal, 'R' represents the reverse signal, and 'F' represents the fog lights. The signal states are each represented with a binary symbol. A binary '1' means that the corresponding signal is asserted; a binary '0' means that the corresponding signal is not asserted. For example, a '1' in the least significant position means that the fog lights are on.

Figure 6:
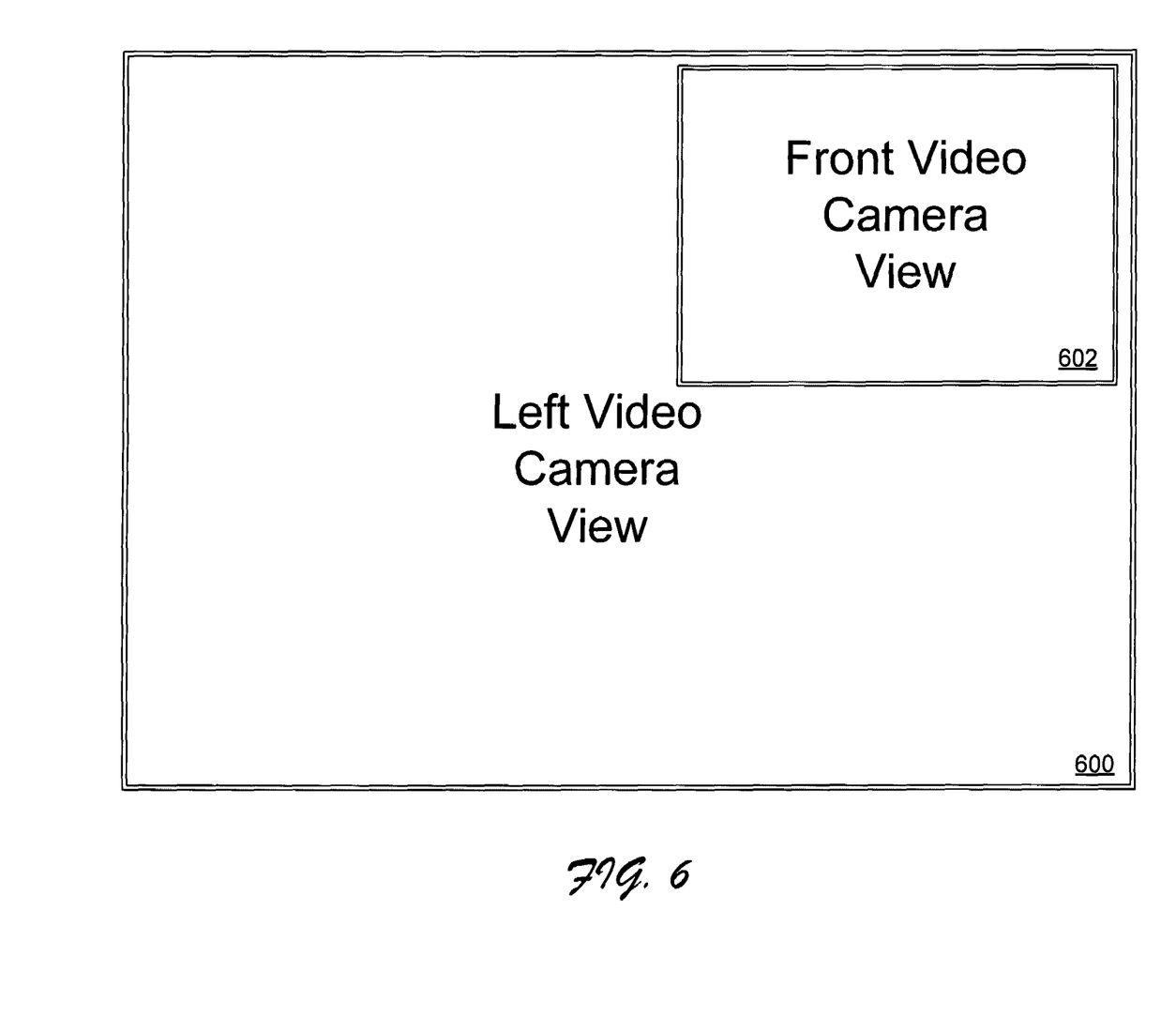
FIG. 6 illustrates exemplary vehicle video views generated from vehicle video sources and presented according to exemplary video presentation modes.
Figure 7:
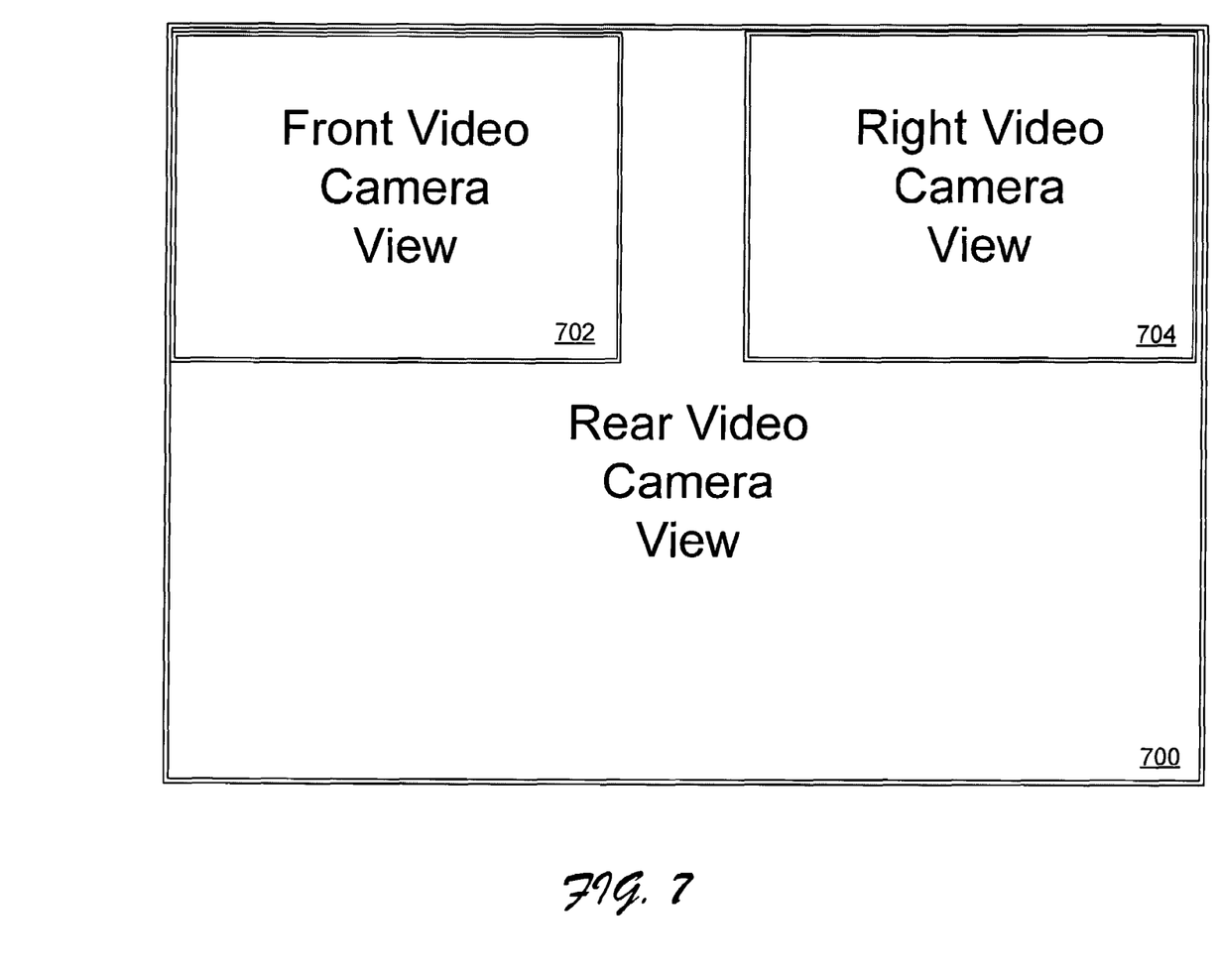
FIG. 7 illustrates other exemplary vehicle video views generated from vehicle video sources and presented according to other exemplary video presentation modes.

A presentation rule comprises an association of a signal state in the left column with a set of video presentation modes in the right column in Table 1. The presentation modes each relate to a video source. In the right column, 'LV' represents the left video source, 'RTV' represents the right video source, 'RV' represents the rear video source, 'FV' represents the front video source. Each presentation rule contains a mode for each video source. Exemplary modes are 'D', 'F', and 'W'. Mode 'D' represents a default mode. Mode 'F' represents full screen display mode. Mode 'W' represents windowed mode. Examples of full screen and windowed modes are illustrated in FIG. 6 and FIG. 7 and discussed in more detail below.

To illustrate, when the fog lights are on and no other vehicle signals are asserted (i.e., signal state is 0001), the front video image is displayed in the full screen (i.e., full screen view 'F') of the display device 306, and the right video image, left video, and rear video image are shown in default mode (i.e., default view 'D'). As another example, when the left turn signal is on (i.e., LT =1), the reverse gear is engaged (i.e., R=1), and the fog lights are off (i.e., F=0), the presentation rule is 'WDFD', meaning that the rear video source image is shown in full screen mode, and the left video source image is shown in a window on top of the rear source image.

Preferably, the default mode(s) of the system are user-definable. Thus, the user can define what he/she wants to be displayed when no signal is asserted; i.e., what view channels and in what format (full screen, windowed or not visible at all). For example, the default mode can be set to a full-sized rear view and two small windows for left and right cameras. For a system with four cameras, this means that the default mode for left and right cameras are 'Window', the default mode for rear view is 'Full' and the default for front camera is 'Off'.

In another implementation of the video management system 300, the display logic 324 and the presentation rules 318 are embodied in a Programmable Read Only Memory (PROM), or Electrically Erasable PROM (EEPROM), or other storage device. Such memory devices can be programmed to map input combinations to output combinations. Thus, Table 1 could be programmed into an EEPROM by programming signal state symbol inputs shown in the left column to video presentation mode outputs shown in the left column.

Table 1 illustrates a limited number of event indicators; i.e., left turn signal (LT), right turn signal (RT), reverse gear signal (R), and fog light signal (F). In another implementation of the presentation rules 318, the video presentation rules are extensible to include more event indicators, such as, but not limited to, door open indicators, obstacle indicators, brake signals, and anti-lock braking system (ABS) signals.

Referring again to FIG. 3, the display logic 324 uses the presentation rules 318 to determine which view or views from the video sources are to be shown and in what mode(s) the views are to be shown. Based on the presentation rules 318, the display logic 324 selects one or more images from the video sources 304 to display on the display device 306. The display logic 324 notifies a video application 326 of the selected video images and modes. The display logic 324 may be part of the video application 326 or separate from the video application 326.

In one implementation of the video management system 300, the video application 326 interacts with an operating system 328 to generate windows or other regions on the screen of the display device 306 in which to present the video images. In this implementation, the operating system 328 is a graphical operating system, such as WINDOWS™ from MICROSOFT™. The video application 326, which can use DIRECTX™ technology from WINDOWS™, requests one or more windows from the operating system 328 and directs a display controller 330 to present the selected video images in the requested windows. The video application 326 may indicate what image data is to be used by sending an image memory pointer to the display controller 330.

With regard to receiving the video source views, video image data representing the video source views is received by a video interface 332 that is in communication with the video sources 304. The video interface 332 typically includes video drivers to control the video sources 304 and receivers to receive the video image data from the video sources 304.

The video interface 332 may store video image data in a video storage 334, from which the display controller 330 can retrieve the video image data. Alternatively, the video interface 332 may send video image data directly to the display controller 330. The display logic 324 selects among the plurality of images from the video sources 304 and directs the selected image(s) to the display controller for output on the display device 306.

In an exemplary implementation of the video management system 300, the presentation rules 318 are configurable and may be extended by a user. Using a user input device 336, the user can input presentation modes to be associated with vehicle events. The user input device 336 may be a keyboard, keypad, touch screen, mouse, or other input device. Alternatively, the presentation rules 318 (or a copy of the presentation rules) can be edited on a remote computer and uploaded to the vehicle via a network connection, or synchronized later using a wired or wireless connection to the video management system 300. The form of the input may be text, graphical, menu driven, an option selection format, or otherwise. The user input device 332 communicates with a user input interface 338 in the video management system 300.

The vehicle video management system 300 includes a processor 322 on which instructions are executed for managing the video presentation. System memory 340 is provided for storage of any data necessary for operation of the video management system. System memory 340 includes computer readable media in the form of volatile memory, such as random access memory (RAM), and/or non-volatile memory, such as read only memory (ROM). System memory 340 can be used to store data structures, such as portions of the presentation rules, and application programs during execution.

Figure 4:
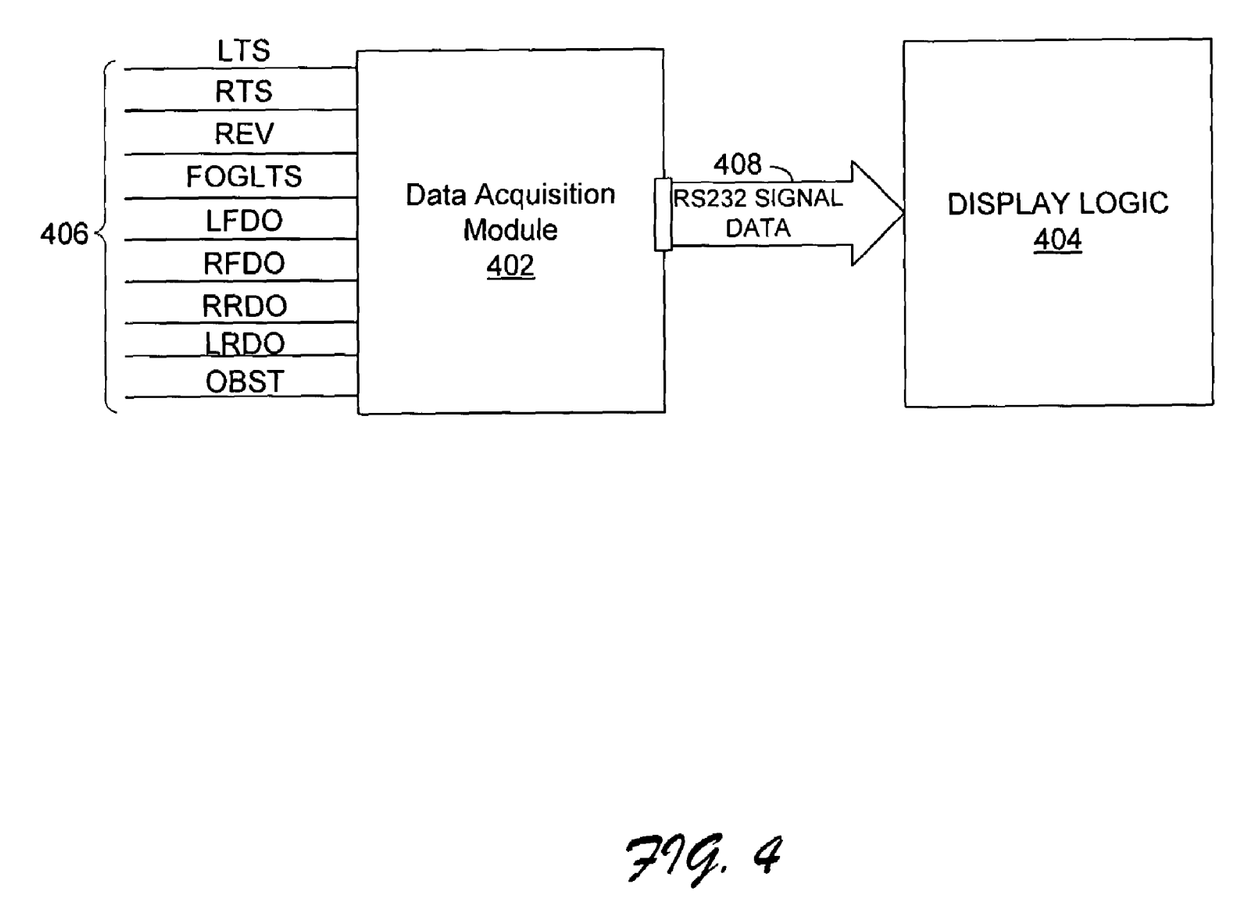
FIG. 4 is a block diagram of an exemplary data acquisition module and display logic that may be implemented in the video management system of FIG. 3.

FIG. 4 is a block diagram of an exemplary data acquisition module 402 and display logic 404 that may be implemented in the video management system of FIG. 3. As shown in FIG. 4, the data acquisition module 402 receives a plurality of raw vehicle signals 406 from various systems in the vehicle. The data acquisition module 402 converts the raw vehicle signals 406 into computer-readable signals 408 that are formatted in accordance with an RS-232 (also referred to as Electronic Industries Association (EIA) 232) standard. Other communication standards could be used as well.

The data acquisition module 402 may be implemented with a digital data acquisition card having 32 inputs for the raw signals 406. In the exemplary implementation of FIG. 4, the raw vehicle signals 406 include a left turn signal (LTS), a right turn signal (RTS), a reverse signal (REV), a fog lights signal (FOGLTS), a left front door open signal (LFDO), a right front door open signal (RFDO), a right rear door open signal (RRDO), a left rear door open signal (LRDO), and an obstacle sensor signal (OBST).

The raw signals 406 take on binary values '0' and '1', wherein a voltage level of 0-2 volts represents logical '0' and 5-24 volts represents logical '1'. The data acquisition module 402 performs any necessary voltage transformation of the raw input signals 406 and makes the signal data available on the RS-232 data path 408. The RS-232 data path 408 may be implemented using various arrangements such as simplex, duplex, or full-duplex. In addition, the connection between the data acquisition module 402 and the display logic 404 may be parallel or serial. Connectors for the RS-232 path 408 are typically characterized by 'DB', such as DB9 or DB25, and either male or female.

The display logic 404 reads the RS-232 data 408 periodically. In a particular implementation, the display logic 404 reads the RS-232 signal data 408 ten times per second. The display logic 404 uses a bit-masking operation to create a binary symbol of the RS-232 signal data 408. In one implementation, the display logic 404 stores the RS-232 signal data 408 and subsequently maps the binary symbols to presentation modes.

In a particular implementation of a vehicle video management system, the data acquisition module 402 is embodied in a Data Acquisition Card (DAC). In this implementation, the DAC converts raw vehicle signals directly into Peripheral Component Interconnect (PCI) bus format; however, any other standard protocol could be used as well.

Exemplary Operations and Presentation Modes

Figure 5:
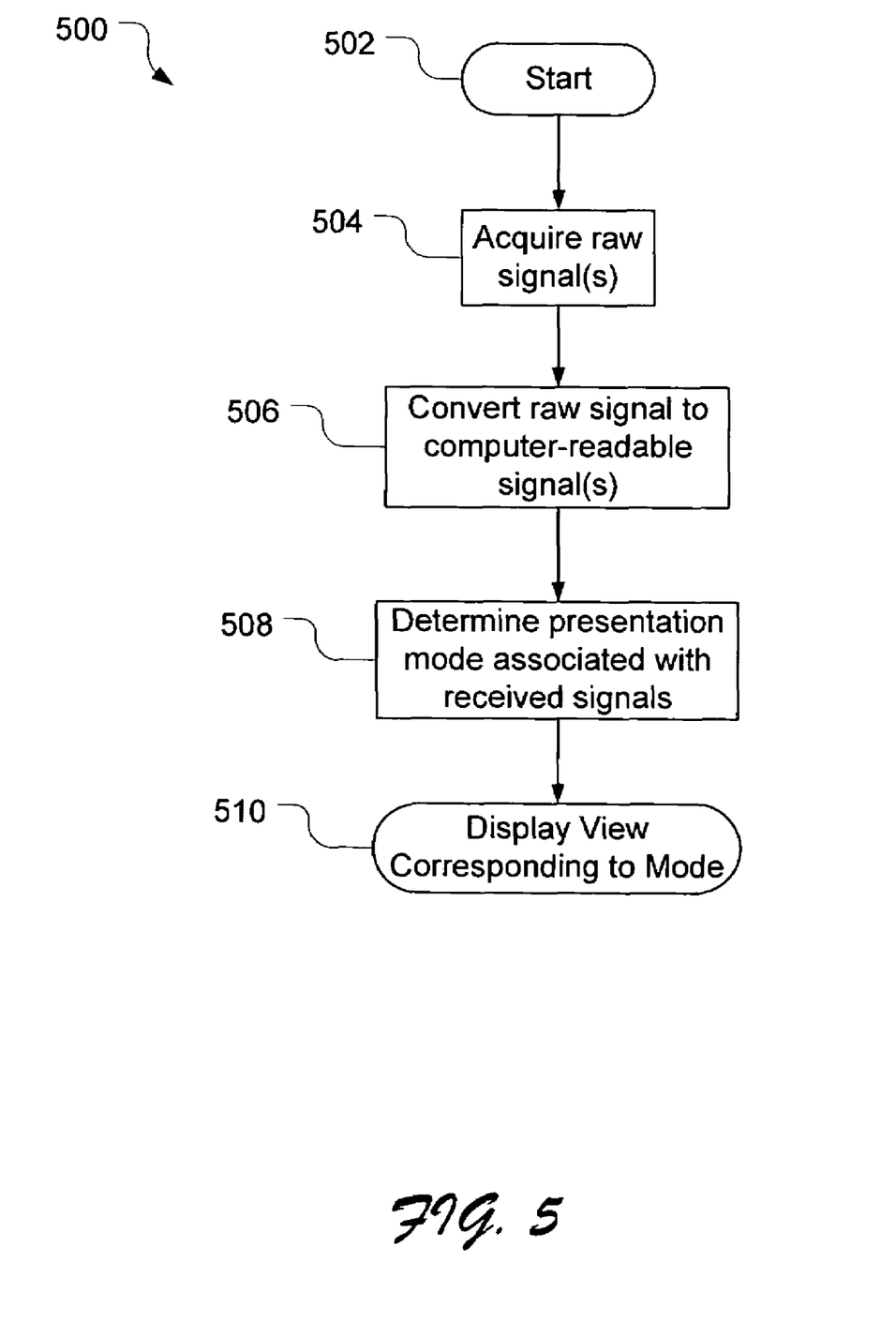
FIG. 5 is a flowchart having exemplary operations for applying the video management rules in response to vehicle events.

FIG. 5 illustrates a vehicle video management operation 500 having exemplary operations for applying the video presentation rules in response to detection of vehicle events. The vehicle video management operation 500 can be executed by video management systems discussed herein, as well as general purpose computers, or other computers adapted for use in a vehicle that employs one or more video cameras.

After a start operation 502, an acquire operation 504 acquires raw signals that indicate events of interest in a vehicle. As discussed above, events of interest may be a left turn, a right turn, an opened door, detection of an obstacle, engagement of selected gears, fog lights on, and others. The acquire operation 504 may sample the raw signals at predetermined times and may further buffer raw signal samples. Alternatively, the acquire operation 504 may store the raw signal data on a substantially continuous basis.

In a converting operation 506, the raw signal data is converted into a computer-readable format. The computer-readable format includes binary symbols representing the detected events. The converting operation 506 may store the binary symbols in memory.

A determining operation 508 determines video presentation modes that correspond to the detected events. One implementation of the determining operation 508 includes looking up the previously generated binary symbols in a data structure that has vehicle signal states associated with preconfigured video presentation mode symbols. The preconfigured video presentation mode symbols represent the manner of displaying video source images given a vehicle signal state.

After a video presentation mode has been determined, a displaying operation 510 displays one or more video images from associated video source(s) in accordance with the determined video presentation mode. As discussed above with respect to Table 1, in one implementation, the video presentation mode can include a full view, a windowed view, or a default view.

Other types of presentation modes may be employed in other implementations. For example, another mode involves presenting a windowed view on top of a full screen view for a predetermined length of time and then removing the windowed view from the display.

FIG. 6 illustrates how vehicle video data from a combination of one or more vehicle video sources may be presented on an in-vehicle display device according to a presentation rule associated with an exemplary vehicle event scenario. The scenario illustrated FIG. 6 corresponds to the signal state '1001' shown in Table 1 above. The symbol state '1001' indicates that the left turn signal is on and the fog lights are on. As shown in FIG. 6, a full view mode 600 is applied to the left video camera image and a window view mode 602 is applied to the front video camera image as is according to the presentation rule 'FDDW' shown in Table 1.

FIG. 7 illustrates an arrangement of video source views from a combination of one or more vehicle video sources may be presented on an in-vehicle display device according to a presentation rule associated with another exemplary vehicle event scenario. The scenario illustrated FIG. 7 corresponds to the signal state '0111' shown in Table 1 above. The symbol state '0111' indicates that the right turn signal is on, the fog lights are on, and the vehicle is in reverse. As shown in FIG. 7, the rear video camera image is presented in full screen 700, the front video camera image is presented in a first window 702, and a the right video camera image is presented in a second window 704 as is according to the presentation rule 'DWFW' shown in Table 1.

Figure 8:
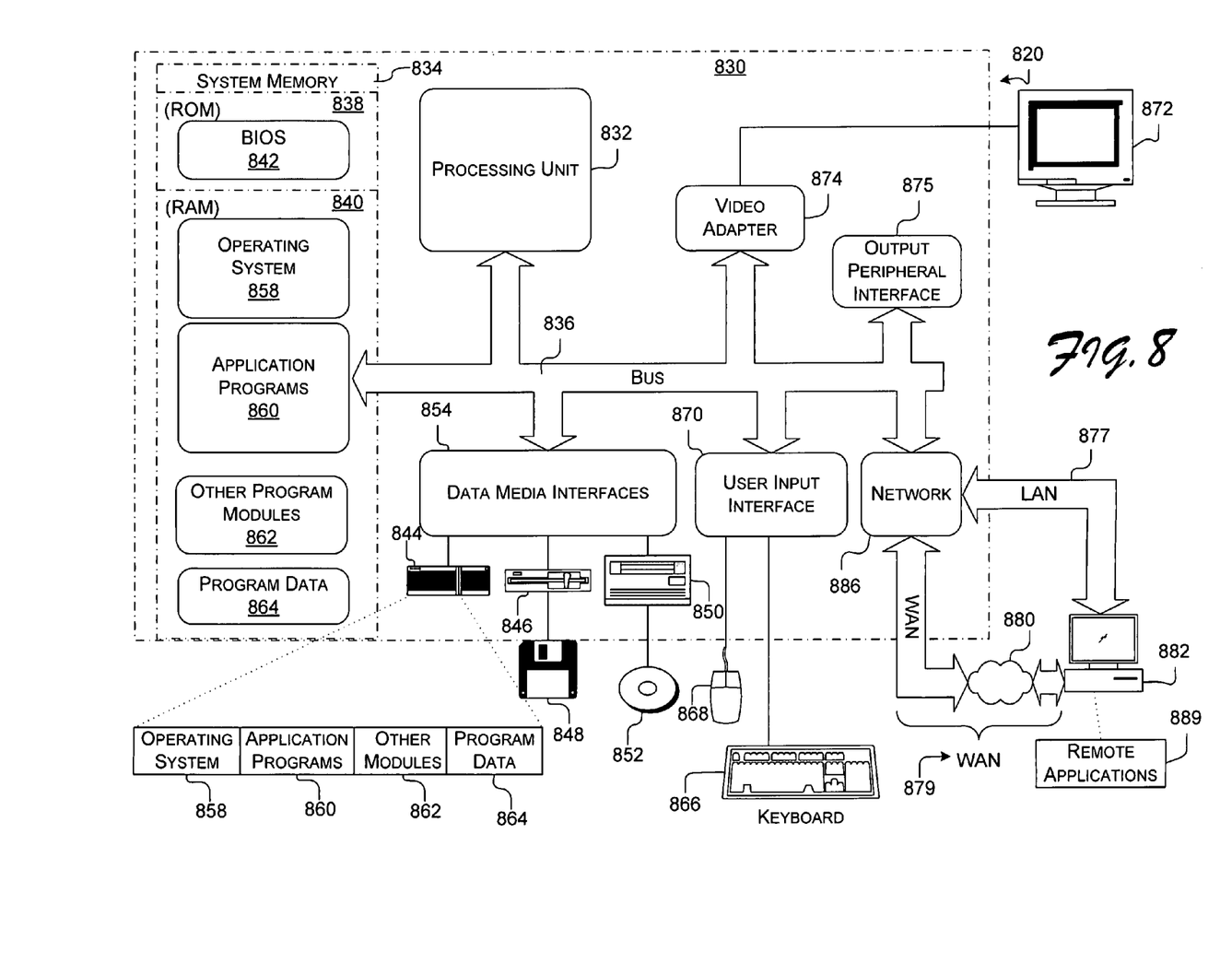
FIG. 8 illustrates a suitable computing system for implementing a vehicle video management scheme.

Exemplary Computer System that may be Used to Implement a Smart Vehicle Video Management Scheme FIG. 8 and the corresponding discussion are intended to provide a general description of a suitable computing environment in which the described arrangements and procedures for managing vehicle video sources may be implemented. Exemplary computing environment 820 is only one example of a suitable computing environment and is not intended to suggest any limitation as to the scope of use or functionality of the described subject matter. Neither should the computing environment 820 be interpreted as having any dependency or requirement relating to any one or combination of components illustrated in the exemplary computing environment 820.

The exemplary arrangements and procedures for smart vehicle video management are operational with numerous other general purpose or special purpose computing system environments or configurations. Examples of well known computing systems, environments, and/or configurations that may be suitable for use with the described subject matter include, but are not limited to, personal computers, server computers, thin clients, thick clients, hand-held or laptop devices, multiprocessor systems, microprocessor-based systems, distributed computing environments such as server farms and corporate intranets, and the like, that include any of the above systems or devices.

The computing environment 820 includes a general-purpose computing device in the form of a computer 830. The computer 830 may include and/or serve as an exemplary implementation of a vehicle-based computer for vehicle video management described above with reference to FIGS. 1-7. The computer 830 may also include and/or serve as an exemplary implementation of a network-based client, server, or other computing device that may be in communications with the vehicle-based computer. The components of the computer 830 may include, by are not limited to, one or more processors or processing units 832, a system memory 834, and a bus 836 that couples various system components including the system memory 834 to the processor 832.

The bus 836 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

The computer 830 typically includes a variety of computer readable media. Such media may be any available media that is accessible by the computer 830, and it includes both volatile and non-volatile media, removable and non-removable media.

The system memory includes computer readable media in the form of volatile memory, such as random access memory (RAM) 840, and/or non-volatile memory, such as read only memory (ROM) 838. A basic input/output system (BIOS) 842, containing the basic routines that help to communicate information between elements within the computer 830, such as during start-up, is stored in ROM 838. The RAM 840 typically contains data and/or program modules that are immediately accessible to and/or presently be operated on by the processor 832.

The computer 830 may further include other removable/non-removable, volatile/non-volatile computer storage media. By way of example only, FIG. 8 illustrates a hard disk drive 844 for reading from and writing to a non-removable, non-volatile magnetic media (not shown and typically called a "hard drive"), a magnetic disk drive 846 for reading from and writing to a removable, non-volatile magnetic disk 848 (e.g., a "floppy disk"), and an optical disk drive 850 for reading from or writing to a removable, non-volatile optical disk 852 such as a CD-ROM, DVD-ROM or other optical media. The hard disk drive 844, magnetic disk drive 846, and optical disk drive 850 are each connected to bus 836 by one or more interfaces 854.

The drives and their associated computer-readable media provide nonvolatile storage of computer readable instructions, data structures, program modules, and other data for the computer 830. Although the exemplary environment described herein employs a hard disk, a removable magnetic disk 848 and a removable optical disk 852, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 848, optical disk 852, ROM 838, or RAM 840, including, by way of example, and not limitation, an operating system 858, one or more application programs 860, other program modules 862, and program data 864. Application programs 860 may include a smart vehicle video management application for managing one or more view(s) from video source(s) mounted in or on a vehicle.

A user may enter commands and information into the computer 830 through optional input devices such as a keyboard 866, a pointing device 868 (such as a "mouse"), and a touch screen on the monitor 872. Other input devices (not shown) may include a microphone, joystick, game pad, satellite dish, serial port, scanner, or the like. These and other input devices are connected to the processing unit 832 through a user input interface 870 that is coupled to the bus 836, but may be connected by other interface and bus structures, such as a parallel port, game port, or a universal serial bus (USB).

An optional monitor 872 or other type of display device is connected to the bus 836 via an interface, such as a video adapter 874. In addition to the monitor, personal computers typically include other peripheral output devices (not shown), such as speakers, which may be connected through output peripheral interface 875.

The computer 830 may operate in a networked environment using logical connections to one or more remote computers, such as a remote computer 882. The remote computer 882 may include many or all of the elements and features described herein relative to the computer 830. The logical connections shown in FIG. 8 are a local area network (LAN) 877 and a general wide area network (WAN) 879. In a vehicle-based computer, the LAN 877 and/or the WAN 879 are typically composed of wireless networks. In a network-based computing device, the LAN 877 and/or WAN 879 may be composed of wired networks, wireless networks, or any combination of wired or wireless networks. Such networking environments are commonplace in offices, enterprise-wide computer networks, intranets, and the Internet.

When used in a LAN networking environment, the computer 830 is connected to the LAN 877 via a network interface or an adapter 886. The network interface 886 provides communications services for transmitting and receiving data to and from one or more clients. For example, the network interface 886 formats, encodes, modulates, demodulates, and decrypts data communicated via the LAN 877. The network interface 886 operably communicates over a network using a standard network communication protocol. Examples of communications devices suitable for the network interface 886 in a vehicle-based server computer include a cellular modem, Wireless Fidelity (WiFi), or other wireless communications devices.

The network adapter 886 may also be used to facilitate communications in a WAN 879 networking environment. As such, the computer 830 typically communicates via the network adapter 886 or other means for establishing communications over the WAN 879. The network adapter 886, which may be internal or external, may be connected to the system bus 836 via the user input interface 870 or other appropriate mechanism. Depicted in FIG. 8 is a specific implementation of a WAN via the Internet.

In a networked environment, program modules depicted relative to the personal computer 830, or portions thereof, may be stored in a remote memory storage device. By way of example, and not limitation, FIG. 8 illustrates remote application programs 889 as residing on a memory device of remote computer 882. It will be appreciated that the network connections shown and described are exemplary and other means of establishing a communications link between the computers may be used.

Although some exemplary methods, devices and exemplary systems have been illustrated in the accompanying drawings and described in the foregoing detailed description, it will be understood that the methods and systems are not limited to the exemplary embodiments disclosed, but are capable of numerous rearrangements, modifications and substitutions without departing from the spirit set forth and defined by the following claims.

What is claimed is:

1. A method for implementing a user configurable video management system on a vehicle, the method comprising:
   selecting multiple sets of multiple video source views from a plurality of vehicle-mounted video sources, the multiple sets based on:
   a default mode; and
   detection of a plurality of vehicle events; and
   displaying the multiple video source views of one of the multiple sets simultaneously,
   wherein the displaying comprises a full view mode of one of the multiple video source views of the one of the multiple sets, and multiple windows within the full view mode, each of the multiple windows containing another of the multiple video source views of the one of the multiple sets; and
   configuring each of the multiple sets of the multiple video source views according to user-definable presentation modes, the presentation modes comprising the default mode and other modes, the other modes being based on the plurality of vehicle events.

2. A method as recited in claim 1, wherein the user-definable presentation modes are pre-assigned by a user configuring presentation rules associated with each of the presentation modes, wherein the configuring of the presentation rules by the user is facilitated by a user input device at the video management system.

3. A method as recited in claim 1 further comprising detecting one of the plurality of vehicle events that is associated with one of the multiple set of multiple video source views.

4. A method as recited in claim 1 further comprising associating a plurality of vehicle events with at least one video source view.

5. A method as recited in claim 1 further comprising associating, by a user, the plurality of vehicle events with at least one video presentation mode.

6. A method as recited in claim 1 further comprising configuring, by a user, a data structure on a computer readable medium, the data structure comprising an association between a vehicle event indicator and video source view.

7. A method as recited in claim 1 further comprising configuring a data structure on a computer readable medium, the data structure comprising an association between a vehicle event indicator and a mode of presenting a video source view.

8. A method as recited in claim 1 wherein each of the plurality of vehicle events comprises at least one of:
   a left turn signal state;
   a right turn signal state;
   a left front door open signal state;
   a left rear door open signal state;
   a right front door open signal state;
   a right rear door open signal state;
   a headlights signal state;
   a reverse gear signal state;
   an obstacle detection signal state;
   a light sensor state;
   a temperature sensor state;
   an audio sensor state.

9. A method as recited in claim 1 wherein the selecting comprises looking up an event indicator corresponding to the event in a table of video presentation rules.

10. A method as recited in claim 1 further comprising configuring, by a user, presentation rules associating a plurality of event indicators with a plurality of video display modes.

11. A method as recited in claim 1, wherein the user-definable presentation modes are pre-assigned by a user configuring presentation rules associated with the presentation modes, wherein the configuring of the presentation rules by the user is facilitated by a remote computing device to edit the presentation rules and upload the edited presentation rules into the vehicle video management system.

12. A computer-readable medium encoded with a computer program, that when executed by a processor in a vehicle video management system, perform a process, the process comprising:
   selecting multiple sets of multiple video source views from a plurality of vehicle-mounted video sources, the multiple sets being based on:
      a default mode; and
      detection of a plurality of vehicle events; and
   displaying the multiple video source views of one of the multiple sets simultaneously, wherein the displaying comprises a full view mode of one of the multiple video source views of the one of the multiple sets, and multiple windows within the full view mode containing another of the multiple video source views of the one of the multiple sets; and
   configuring each of the multiple sets of the multiple video source views according to user-definable presentation modes, the presentation modes comprising the default mode and other modes, each of the other modes being associated with each of the plurality of vehicle events.

13. A computer-readable medium as recited in claim 12, wherein the user-definable presentation modes are pre-assigned by a user editing presentation rules associated with each of the presentation modes.

14. A computer-readable medium as recited in claim 13, wherein the displaying operation further comprises simultaneously displaying more than two video source views.

15. A method as recited in claim 13, wherein the user-definable presentation modes are pre-assigned by a user editing presentation rules associated with the presentation modes, wherein the editing of the presentation rules by the user is facilitated by a user input device at the vehicle video management system.

16. A method as recited in claim 13, wherein the user-definable presentation modes are pre-assigned by a user editing presentation rules associated with the presentation modes, wherein the editing of the presentation rules by the user is facilitated by a remote computing device to edit the presentation rules and upload the edited presentation rules into the vehicle video management system.

17. A computer-readable medium as recited in claim 12, the process further comprising detecting one of the plurality of vehicle events that is associated with one of the multiple set of multiple video source views.

18. A computer-readable medium as recited in claim 12, the process further comprising associating, by a user, the plurality of vehicle events with at least one video source view.

19. A computer-readable medium as recited in claim 12, the process further comprising associating the plurality of vehicle events with at least one video presentation mode.

20. A computer-readable medium as recited in claim 12, the process further comprising configuring a data structure on a computer readable medium, the data structure comprising an association between a vehicle event indicator and video source view.

21. A computer-readable medium as recited in claim 12 the process further comprising configuring a data structure, by a user, on a computer readable medium, the data structure comprising an association between a vehicle event indicator and a mode of presenting a video source view.

22. A computer-readable medium as recited in claim 12, wherein each of the vehicle events comprises at least one of:
   a left turn signal state;
   a right turn signal state;
   a left front door open signal state;
   a left rear door open signal state;
   a right front door open signal state;
   a right rear door open signal state;
   a lights on signal state;
   a reverse gear signal state;
   an obstacle detection signal state;
   a light sensor state;
   a temperature sensor state;
   an audio sensor state.

23. A computer-readable medium as recited in claim 12 wherein the selecting comprises looking up an event indicator corresponding to the event in a table of video presentation rules.

24. A computer-readable medium as recited in claim 12, the process further comprising configuring presentation rules associating a plurality of event indicators with a plurality of video display modes.

25. A vehicle video management system, the system comprising:
   display logic selecting multiple video source views from a plurality of vehicle-mounted video sources based on detection of a vehicle event;
   a display device for displaying the multiple video source views simultaneously, wherein the displaying comprises a full view mode of one of the multiple video source views, and a multiple windows within the full view mode containing another of the multiple video source views, wherein the display device displaying the multiple video source views is performed according to a presentation mode; and
   a user interface to receive input by a user of the system for pre-configuring multiple presentation modes, the multiple presentation modes comprising:
      a default mode; and
      other modes each based on each of a plurality of detected vehicle events.

26. A system as recited in claim 25 further comprising a vehicle sensor detecting the vehicle event.

27. A system as recited in claim 25 further comprising presentation rules including an association between a plurality of vehicle events and at least one video source view.

28. A system as recited in claim 25 further comprising presentation rules including an association between a plurality of vehicle events and at least one video presentation mode.

29. A system as recited in claim 25, wherein the user interface is operable to receive input by the user of the system for configuring a data structure on a computer readable medium, the data structure comprising an association between a vehicle event indicator and video source view.

30. A system as recited in claim 25, wherein the user interface is operable to receive input by the user of the system for configuring a data structure on a computer readable medium, the data structure comprising an association between a vehicle event indicator and a mode of presenting a video source view.

31. A system as recited in claim 25, wherein the display device displays one of the multiple video source views in the default mode, wherein the default mode has been configured by the user of the system at a remote computer and uploaded to the system, wherein the display device displays the default mode when no vehicle events are detected.

32. A system as recited in claim 25, wherein the display device simultaneously displays two or more video source views.

33. A system as recited in claim 25 wherein the vehicle event comprises at least one of:
  a left turn signal state;
  a right turn signal state;
  a left front door open signal state;
  a left rear door open signal state;
  a right rear door open signal state;
  a lights on signal state;
  a reverse gear signal state;
  an obstacle detection signal state;
  a light sensor state;
  a temperature sensor state;
  an audio sensor state.

34. A system as recited in claim 25 wherein the display logic looks up an event indicator corresponding to the event in a table of video presentation rules.

35. A system as recited in claim 25 further comprising extensible presentation rules associating a plurality of event indicators with a plurality of video display modes.

36. A vehicle comprising:
  a computer having display logic selecting multiple video source views from a plurality of video sources mounted on the vehicle based on detection of a vehicle event;
  a display device communicating with the computer for displaying the multiple video source views simultaneously, wherein the displaying comprises a full view mode of one of the multiple video source views, and multiple windows within the full view mode containing another of the multiple video source views, wherein the display device communicating with the computer to display the multiple video source views is performed according to a presentation mode; and
  a user interface to receive input by a user of the vehicle for pre-configuring multiple presentation modes, the multiple presentation modes comprising:
    a default mode for displaying when no vehicle event is detected; and
    other modes each based on each of a plurality of detected vehicle events.

37. A vehicle as recited in claim 36 further comprising a vehicle sensor in communication with the computer, the vehicle sensor detecting the vehicle event.

38. A vehicle as recited in claim 36, wherein the computer further comprises a computer-readable medium having stored thereon presentation rules including an association between a plurality of vehicle events and at least one video source view.

39. A vehicle as recited in claim 36, wherein the computer further comprises a computer-readable medium having stored thereon presentation rules including an association between a plurality of vehicle events and at least one video presentation mode.

40. A vehicle as recited in claim 36, wherein the user interface is operable to receive input by the user of the vehicle for configuring a data structure on a computer-readable medium, the data structure comprising an association between a vehicle event indicator and video source view, the data structure being readable by the display logic to select the video source view.

41. A vehicle as recited in claim 36, wherein the user interface is operable to receive input by the user of the vehicle for configuring a data structure on a computer readable medium, the data structure comprising an association between a vehicle event indicator and a mode of presenting a video source view, the data structure being readable by the display logic to select the video source view.

42. A vehicle as recited in claim 36, wherein the display device displays one of the multiple video source views in the default mode, wherein the default mode has been configured by the user of the vehicle at a remote computer and uploaded to the vehicle.

43. A vehicle as recited in claim 36, wherein the display device simultaneously displays more than two video source views.

44. A vehicle as recited in claim 36 wherein the vehicle event is selected from a group comprising:
  a left turn signal state;
  a right turn signal state;
  a left front door open signal state;
  a left rear door open signal state;
  a right front door open signal state;
  a right rear door open signal state;
  a lights on signal state;
  a reverse gear signal state;
  an obstacle detection signal state;
  a light sensor state;
  a temperature sensor state;
  an audio sensor state.

45. A vehicle as recited in claim 36 wherein the display logic looks up an event indicator corresponding to the event in a table of video presentation rules.

46. A vehicle as recited in claim 36 further comprising extensible presentation rules associating a plurality of event indicators with a plurality of video display modes.

* * * * *

UNITED STATES PATENT AND TRADEMARK OFFICE
CERTIFICATE OF CORRECTION

| | | |
|---|---|---|
| PATENT NO. | : 7,463,281 B2 | Page 1 of 1 |
| APPLICATION NO. | : 10/735393 | |
| DATED | : December 9, 2008 | |
| INVENTOR(S) | : Eugene Luskin et al. | |

It is certified that error appears in the above-identified patent and that said Letters Patent is hereby corrected as shown below:

In column 13, line 28, in Claim 11, after "the" delete "vehicle".

In column 13, line 54, in Claim 14, delete "13," and insert -- 13 --, therefor.

In column 14, line 7, in Claim 18, delete "12,the" and insert -- 12, the --, therefor.

In column 14, line 18, in Claim 21, delete "12" and insert -- 12, --, therefor.

In column 14, line 23, in Claim 22, delete "12," and insert -- 12 --, therefor.

In column 14, line 55, in Claim 25, after "and" delete "a".

In column 15, line 33, in Claim 33, below "a left rear door open signal state;" insert -- a right front door open signal state; --.

Signed and Sealed this
Tenth Day of May, 2011

David J. Kappos
*Director of the United States Patent and Trademark Office*